(12) United States Patent
Boulet et al.

(10) Patent No.: US 12,140,210 B2
(45) Date of Patent: Nov. 12, 2024

(54) CONTINUOUSLY VARIABLE TRANSMISSION FOR ELECTRIC VEHICLES

(71) Applicant: THE ROYAL INSTITUTION FOR THE ADVANCEMENT OF LEARNING/MCGILL UNIVERSITY, Montréal (CA)

(72) Inventors: Benoit Boulet, Boucherville (CA); Abdeslam Medouar, Montreal (CA)

(73) Assignee: THE ROYAL INSTITUTE FOR THE ADVANCEMENT OF LEARNING/MCGILL UNIVERSITY, Montreal (CA)

(*) Notice: Subject to any disclaimer, the term of this patent is extended or adjusted under 35 U.S.C. 154(b) by 0 days.

(21) Appl. No.: 18/566,235

(22) PCT Filed: Jun. 3, 2022

(86) PCT No.: PCT/CA2022/050886
§ 371 (c)(1),
(2) Date: Dec. 1, 2023

(87) PCT Pub. No.: WO2022/251966
PCT Pub. Date: Dec. 8, 2022

(65) Prior Publication Data
US 2024/0263687 A1    Aug. 8, 2024

Related U.S. Application Data

(60) Provisional application No. 63/196,962, filed on Jun. 4, 2021.

(51) Int. Cl.
*F16H 3/72*    (2006.01)
*B60W 10/08*   (2006.01)
(Continued)

(52) U.S. Cl.
CPC .............. *F16H 3/721* (2013.01); *B60W 10/08* (2013.01); *B60W 10/101* (2013.01);
(Continued)

(58) Field of Classification Search
CPC .... F16H 3/721; F16H 3/64; F16H 2200/0021; F16H 2200/2007; F16H 2200/2035;
(Continued)

(56) References Cited

U.S. PATENT DOCUMENTS 10,500,940 B2 * 12/2019 Garcia ................ B60K 11/02
2006/0154773 A1 * 7/2006 Dupriez ............... F16H 3/72
475/5

(Continued)

FOREIGN PATENT DOCUMENTS

CA    2905460     3/2016
CN    105736654 A 7/2016

*Primary Examiner* — Edwin A Young
(74) *Attorney, Agent, or Firm* — Norton Rose Fulbright Canada LLP

(57) ABSTRACT

A continuously-variable transmission (CVT) has: a gearbox having a first planetary gear train, a second planetary gear train, a first rotating spool defined by one of two sun gears, two ring gears, and two carriers of the first and second planetary gear train, a second rotating spool defined by another one of the two sun gears, the two ring gears, and the two carriers, an input defined by a remaining one of the first sun gear, the first carrier, and the first ring gear, and an output defined by a remaining one of the second sun gear, the second carrier, and the second ring gear; a first brake operatively connected to the first rotating spool; a second brake operatively connected to the second rotating spool; and a transmission motor drivingly engaged to the first rotating spool or to the second rotating spool.

20 Claims, 6 Drawing Sheets

(51) Int. Cl.
*B60W 10/101* (2012.01)
*B60W 30/19* (2012.01)
*F16H 3/64* (2006.01)

(52) U.S. Cl.
CPC ............... *B60W 30/19* (2013.01); *F16H 3/64* (2013.01); *B60W 2510/081* (2013.01); *B60W 2510/083* (2013.01); *B60W 2540/10* (2013.01); *B60W 2710/08* (2013.01); *B60W 2710/1005* (2013.01); *F16H 2200/0021* (2013.01); *F16H 2200/2007* (2013.01); *F16H 2200/2035* (2013.01)

(58) Field of Classification Search
CPC .... B60W 10/08; B60W 10/101; B60W 30/19; B60W 2510/081; B60W 2510/083; B60W 2540/10; B60W 2710/08; B60W 2710/1005
See application file for complete search history.

(56) References Cited

U.S. PATENT DOCUMENTS

2015/0330492 A1* 11/2015 Lee .................... B60K 1/00
475/331
2016/0091059 A1   3/2016 Boulet et al.

* cited by examiner

CONTINUOUSLY VARIABLE TRANSMISSION FOR ELECTRIC VEHICLES

CROSS-REFERENCE TO RELATED APPLICATION

This present application claims the priority of U.S. Patent Application No. 63/196,962, filed on Jun. 4, 2021, and incorporated herein by reference.

TECHNICAL FIELD

This disclosure generally relates to the field of transmission systems and, more particularly, to the field of transmissions for electric vehicles.

BACKGROUND

Increasing fuel costs and environmental concerns have pushed the automotive industry to gradually replace internal combustion engine (ICE) vehicles with hybrid electric (HEV) and fully electric vehicles (EV). However, the energy density of electric batteries is much less than that of fossil fuels. Thus, by changing the source of power from internal combustion engine to electric motor, it is necessary to minimize the losses in the driveline in order to maximize the range of EVs. Pure electric vehicles in the market are mostly equipped with a single ratio transmission with a trade-off between efficiency and dynamic performance, such as maximum speed, acceleration, and gradability.

SUMMARY

A continuously variable transmission (CVT) design is proposed, which suggests the addition of a motor to a common sun gear of a dual-brake transmission. This may extend the range of achievable gear ratios. This flexibility may allow the CVT to operate a traction or propelling motor of the vehicle closer to the optimal regions of its torque speed curve.

In one aspect, there is provided a continuously-variable transmission (CVT) for a vehicle having a motor, comprising: a planetary gear train having: two sun gears, two sets of planet gears each meshed with a respective one of the two sun gears, two ring gears each meshed with a respective one of the two sets of planet gears, and two carriers each rollingly supporting a respective one of the two sets of planet gears, a first rotating spool defined one of the two sun gears, the two ring gears, and the two carriers connected together, a second rotating spool defined by another one of the two sun gears, the two ring gears, and the two carriers connected together, an input and an output of the planetary gear train defined respectively by a remaining one of the two sun gears, the two ring gears, and the two carriers, the input configured to be engaged by the motor, the output configured to be engaged to wheels of the vehicle, a first brake operatively connected to the first rotating spool for selectively blocking rotation of the first rotating spool; a second brake operatively connected to the second rotating spool for selectively blocking rotation of the second rotating spool; and a transmission motor drivingly engaged to the first rotating spool or to the second rotating spool.

In some embodiments, the input corresponds a first carrier of the two carriers, the output corresponding to a second carrier of the two carriers, the two sun gears connected together, the two ring gears connected together.

In some embodiments, the two sun gears differ in their diameters.

In some embodiments, a controller is operatively connected to the transmission motor and to the motor of the vehicle, the controller having a processing unit and a memory operatively connected to the processing unit and having instructions store thereon executable by the processing unit for: controlling the motor of the vehicle based on commands received from an accelerator of the vehicle; receiving a sensor signal from at least one sensor while the motor is in operation, the sensor signal indicative of an operating condition of the motor; determining an optimal gear ratio of the CVT based on the operating condition; and changing a rotational speed of the transmission motor based on the operating condition to set a gear ratio between the input and the output to the determined optimal gear ratio.

In some embodiments, the at least one sensor includes a torque sensor and a speed sensor operatively connected to the controller, the receiving of the sensor signal includes receiving a torque signal indicative of a torque generated by the motor and receiving a speed signal indicative of a rotational speed of the motor.

In some embodiments, the determining of the optimal gear ratio includes determining an optimal rotational speed of the motor based on the torque and determining the optimal gear ratio as a function of an actual rotational speed of the motor and the optimal rotational speed.

In some embodiments, the determining of the optimal rotational speed includes determining the optimal rotational speed based on a torque-speed efficiency map of the motor.

In some embodiments, the motor is an electric motor.

In some embodiments, the motor is a generator.

In another aspect, there is provided a vehicle equipped with a continuously-variable transmission as defined above.

In still another aspect, there is provided an electric vehicle equipped with a continuously-variable transmission as defined above.

In yet another aspect, there is provided a continuously-variable transmission (CVT) for a vehicle having a motor, comprising: a planetary gear train having: at least sun gear, two sets of planet gears meshed with the at least one sun gear, two ring gears each meshed with a respective one of the two sets of planet gears, and two carriers each rollingly supporting a respective one of the two sets of planet gears, a first rotating spool defined one of the at least one sun gear, the two ring gears, and the two carriers connected together, a second rotating spool defined by another one of the at least one sun gear, the two ring gears, and the two carriers connected together, an input and an output of the planetary gear train defined respectively by a remaining one of the at least one sun gear, the two ring gears, and the two carriers, the input configured to be engaged by the motor, the output configured to be engaged to wheels of the vehicle, a first brake operatively connected to the first rotating spool for selectively blocking rotation of the first rotating spool; a second brake operatively connected to the second rotating spool for selectively blocking rotation of the second rotating spool; and a transmission motor drivingly engaged to the first rotating spool or to the second rotating spool.

In some embodiments, the motor provides a rotational input to wheel of the vehicle via the transmission.

In some embodiments, the motor is a generator and receives a rotational input from wheels of the vehicle via the transmission.

In another embodiment, there is provided a continuously-variable transmission (CVT) for a vehicle having a motor, comprising: a planetary gear train having: two sun gears, two sets of planet gears each meshed with a respective one of the two sun gears, at least one ring gear meshed with the two sets of planet gears, and two carriers each rollingly supporting a respective one of the two sets of planet gears, a first rotating spool defined one of the two sun gears, the at least one ring gear, and the two carriers connected together, a second rotating spool defined by another one of the two sun gears, the at least one ring gear, and the two carriers connected together, an input and an output of the planetary gear train defined respectively by a remaining one of the two sun gears, the at least one ring gear, and the two carriers, the input configured to be engaged by the motor, the output configured to be engaged to wheels of the vehicle, a first brake operatively connected to the first rotating spool for selectively blocking rotation of the first rotating spool; a second brake operatively connected to the second rotating spool for selectively blocking rotation of the second rotating spool; and a transmission motor drivingly engaged to the first rotating spool or to the second rotating spool.

In some embodiments, the motor provides a rotational input to wheel of the vehicle via the transmission.

In some embodiments, the motor is a generator and receives a rotational input from wheels of the vehicle via the transmission.

In another aspect, there is provided a continuously-variable transmission (CVT) for an electric vehicle having an electric motor, comprising: a gearbox having a first planetary gear train having a first sun gear, first planet gears meshed with the first sun gear and rollingly supported by a first carrier, and a first ring gear meshed with the first planet gears, a second planetary gear train having a second sun gear, second planet gears meshed with the second sun gear and rollingly supported by a second carrier, and a second ring gear meshed with the second planet gears, a first rotating spool defined by one of the first sun gear and the second sun gear engaged together, the first carrier and the second carrier engaged together, and the first ring gear and the second ring gear engaged together, a second rotating spool defined by another one of the first sun gear and the second sun gear engaged together, the first carrier and the second carrier engaged together, and the first ring gear and the second ring gear engaged together, an input defined by a remaining one of the first sun gear, the first carrier, and the first ring gear, and an output defined by a remaining one of the second sun gear, the second carrier, and the second ring gear; a first brake operatively connected to the first rotating spool for selectively blocking rotation of the first rotating spool; a second brake operatively connected to the second rotating spool for selectively blocking rotation of the second rotating spool; and a transmission motor drivingly engaged to the first rotating spool or to the second rotating spool.

The transmission described above may include any of the following features, in any combinations.

In some embodiments, the first rotating spool is defined by the first sun gear engaged to the second sun gear, the second rotating spool defined by the first ring gear engaged to the second ring gear, the input defined by the first carrier, the output defined by the second carrier.

In some embodiments, the first sun gear and the second sun gear are parts of a single sun gear.

In some embodiments, the first ring gear and the second ring gear are parts of a single ring gear.

In some embodiments, one or more of the first sun gear, the first planet gears, and the first ring gear has a different diameter than a corresponding one of the second sun gear, the second planet gears, and the second ring gear.

In some embodiments, a controller is operatively connected to the transmission motor and to the electric motor of the electric vehicle, the controller having a processing unit and a memory operatively connected to the processing unit and having instructions store thereon executable by the processing unit for: controlling the electric motor of the electric vehicle based on commands received from an accelerator of the electric vehicle; receiving a sensor signal from at least one sensor while the electric motor is in operation, the sensor signal indicative of an operating condition of the electric motor; determining an optimal gear ratio of the CVT based on the operating condition; changing a rotational speed of the transmission motor based on the operating condition to set a gear ratio between the input and the output to the determined optimal gear ratio; and operating the CVT at the determined optimal gear ratio.

In some embodiments, the at least one sensor includes a torque sensor and a speed sensor operatively connected to the controller, the receiving of the sensor signal includes receiving a torque signal indicative of a torque generated by the electric motor and receiving a speed signal indicative of a rotational speed of the electric motor, the operating condition being one or more of the rotational speed and the torque.

In some embodiments, the determining of the optimal gear ratio includes determining an optimal rotational speed of the electric motor based on the torque and determining the optimal gear ratio as a function of an actual rotational speed of the electric motor and the optimal rotational speed.

In some embodiments, the determining of the optimal rotational speed includes determining the optimal rotational speed based on a torque-speed efficiency map of the electric motor.

In some embodiments, the electric motor is a generator.

In yet another aspect, there is provided an electric vehicle, comprising: an electric motor; and a continuously-variable transmission (CVT) for transmitting power from the electric motor to wheels of the electric vehicle, the CVT having: a gearbox having: a first planetary gear train having a first sun gear, first planet gears meshed with the first sun gear and rollingly supported by a first carrier, and a first ring gear meshed with the first planet gears, a second planetary gear train having a second sun gear, second planet gears meshed with the second sun gear and rollingly supported by a second carrier, and a second ring gear meshed with the second planet gears, a first rotating spool defined by one of the first sun gear and the second sun gear engaged together, the first carrier and the second carrier engaged together, and the first ring gear and the second ring gear engaged together, a second rotating spool defined by another one of the first sun gear and the second sun gear engaged together, the first carrier and the second carrier engaged together, and the first ring gear and the second ring gear engaged together, an input defined by a remaining one of the first sun gear, the first carrier, and the first ring gear, and an output defined by a remaining one of the second sun gear, the second carrier, and the second ring gear; a first brake operatively connected to the first rotating spool for selectively blocking rotation of the first rotating spool; a second brake operatively connected to the second rotating spool for selectively blocking rotation of the second rotating spool; and a transmission motor drivingly engaged to the first rotating spool or to the second rotating spool.

The electric vehicle may include any of the following features, in any combinations.

In some embodiments, the first rotating spool is defined by the first sun gear engaged to the second sun gear, the second rotating spool defined by the first ring gear engaged to the second ring gear, the input defined by the first carrier, the output defined by the second carrier.

In some embodiments, the first sun gear and the second sun gear are parts of a single sun gear.

In some embodiments, the first ring gear and the second ring gear are parts of a single ring gear.

In some embodiments, one or more of the first sun gear, the first planet gears, and the first ring gear has a different diameter than a corresponding one of the second sun gear, the second planet gears, and the second ring gear.

In some embodiments, a controller is operatively connected to the transmission motor and to the electric motor of the electric vehicle, the controller having a processing unit and a memory operatively connected to the processing unit and having instructions store thereon executable by the processing unit for: controlling the electric motor of the electric vehicle based on commands received from an accelerator of the electric vehicle; receiving a sensor signal from at least one sensor while the electric motor is in operation, the sensor signal indicative of an operating condition of the electric motor; determining an optimal gear ratio of the CVT based on the operating condition; changing a rotational speed of the transmission motor based on the operating condition to set a gear ratio between the input and the output to the determined optimal gear ratio; and operating the CVT at the determined optimal gear ratio.

In some embodiments, the at least one sensor includes a torque sensor and a speed sensor operatively connected to the controller, the receiving of the sensor signal includes receiving a torque signal indicative of a torque generated by the electric motor and receiving a speed signal indicative of a rotational speed of the electric motor.

In some embodiments, the determining of the optimal gear ratio includes determining an optimal rotational speed of the electric motor based on the torque and determining the optimal gear ratio as a function of an actual rotational speed of the electric motor and the optimal rotational speed.

In some embodiments, the determining of the optimal rotational speed includes determining the optimal rotational speed based on a torque-speed efficiency map of the electric motor.

In some embodiments, the electric motor is a generator.

Many further features and combinations thereof concerning the present improvements will appear to those skilled in the art following a reading of the instant disclosure.

DETAILED DESCRIPTION

Figure 1:
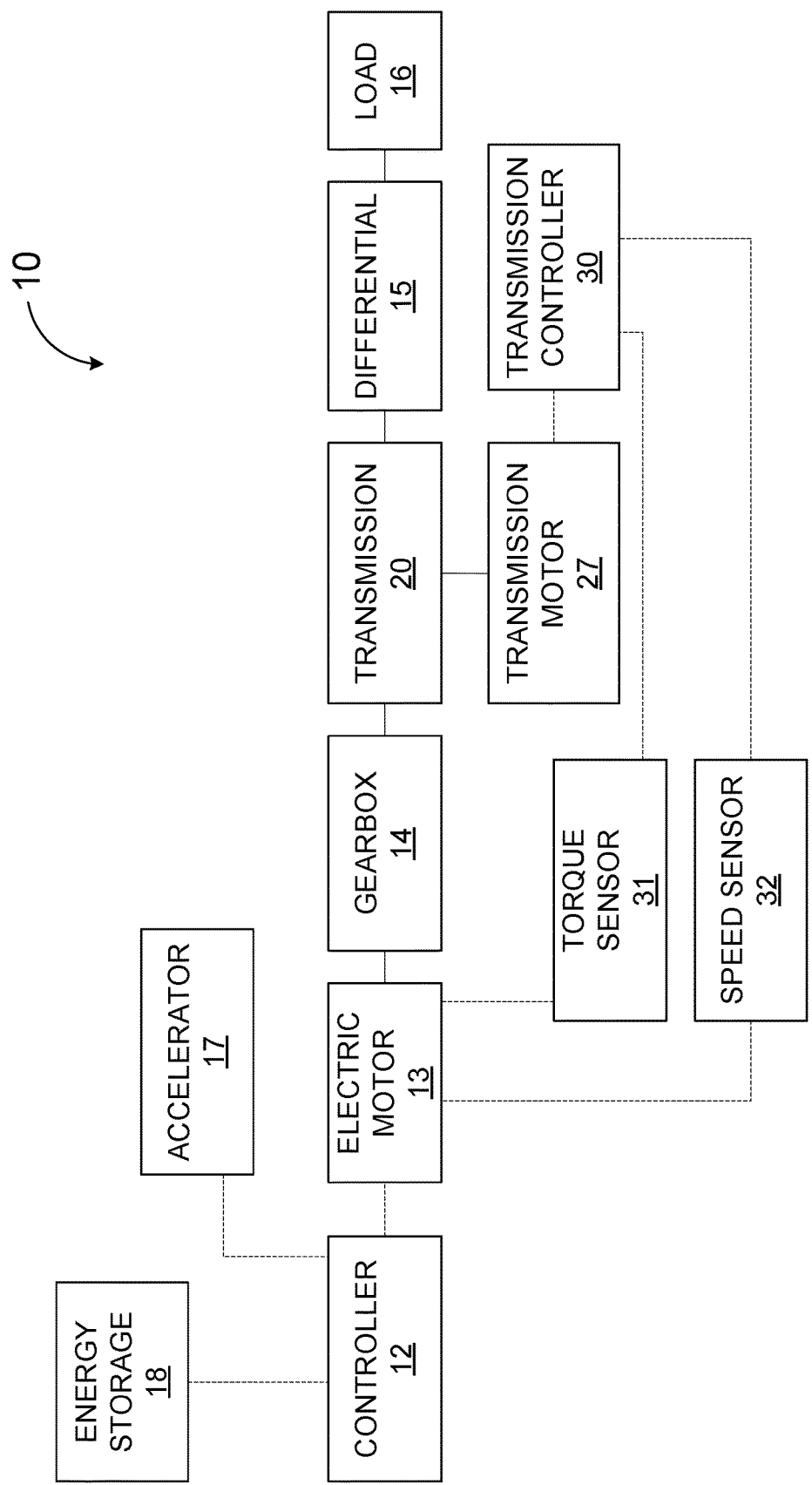
FIG. 1 is a schematic view of a drive system of an electric vehicle in accordance with one embodiment.

Referring to FIG. 1, a drive system of an electric vehicle is shown schematically and is referred to as an electric vehicle 10 and includes a controller 12 for controlling operation of the electric vehicle 10, an electric motor 13 operatively connected to the controller 12, a gearbox 14 in driving engagement with a motor output of the electric motor 13, a differential 15, also referred to as a final drive, drivingly engaged to the gearbox 14, and to a rotatable load, which corresponds to wheels 16 of the vehicle 10. In the embodiment shown, a rotational input is transmitted from the electric motor 13 to the wheels 16 through a transmission 20. Put differently, the wheels 16 of the vehicle 10 are drivingly engaged to the electric motor 13 via the gearbox 14, the differential 15, and the transmission 20. The gearbox 14 and/or the differential 15 may be omitted in some configurations. The transmission 20 has an input drivingly engaged by the electric motor 13 and an output drivingly engaging the wheels 16, herein through the differential 15. The transmission 20 may allow to select a gear ratio between a rotational speed of a motor output of the electric motor 13 and a rotational speed of an output of the transmission 20. The transmission 20 may then be used to maintain the electric motor 13 in a most efficient operating condition as will be discussed below. The controller 12 may be used by a driver of the electric vehicle 10 for varying a rotational speed of the wheels 16, and for varying a speed of travel of the vehicle 10. The controller 12 may be operatively connected to an accelerator 17 (e.g., pedal) of the electric vehicle 10 and is operable for receiving a signal from the accelerator 17 for varying a rotational speed of the motor output of the electric motor 13. In FIG. 1, mechanical connections are shown with solid lines and electrical/control connections are shown with dashed lines.

The main components of the electric propulsion in the electric vehicle 10 are the electric motor 13, a power converter and an electronic controller. The power convertor and the electronic controller may be part of the electric motor 13 in that they are operatively connected thereto. The electric motor 13 is a key constituent in this vehicle 10, as it provides the traction (or propulsion) for the vehicle 10 by turning the electrical energy provided by an energy storage 18 (e.g., battery) to mechanical energy. In the event of deceleration or braking, it may reverse that action and recharge the energy storage 18, ultracapacitor, or flywheel. The power converter provides the proper voltage and current to the electric motor 13, following the commands of controller 12. The controller 12 also interprets accelerator and brake commands from the driver and appropriately produces a torque demand to the electric motor 13.

The design process of an electric propulsion system considers performance capabilities such as acceleration, maximum speed, hill climbing; vehicle constraints of volume and weight; the available energy source compatibility, and cost. Some electric motors, such as permanent magnet synchronous machines, include two regions of operation delimited by the base angular velocity of the motor, namely a constant torque region and a constant power region at high velocity, which determine the maximum torque available from the motor at each angular velocity. This type of motor may have the ideal characteristic for automotive powertrains, offering high traction at low speeds until base speed for acceleration and hill climbing, and low traction at high speeds for constant power operation.

Figure 4:
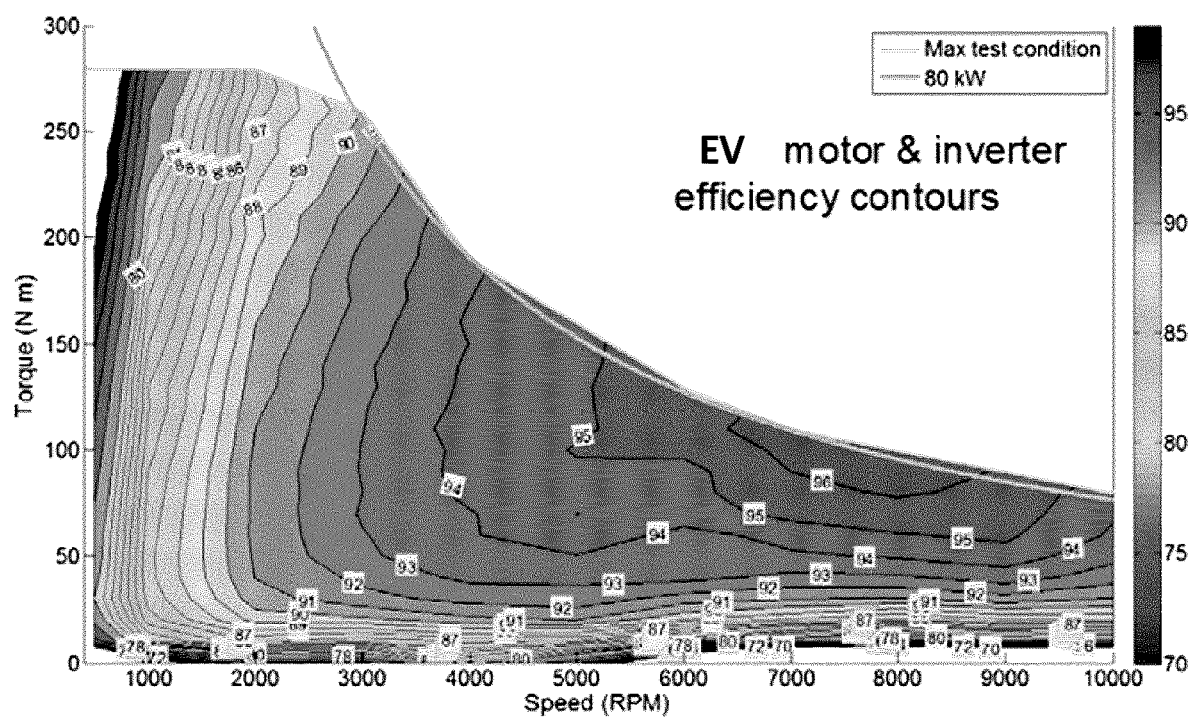
FIG. 4 is a torque-speed efficiency map of an electric motor for the vehicle of FIG. 1.

An important consideration for electric motors is their regions of high efficiency. It is defined as the ratio of output power to input power. These regions are typically depicted in efficiency maps, an example of which is shown in FIG. 4, and are highly dependent on the type of electric motor at hand. The sources of losses affecting different designs are numerous, such as friction, copper, stray, and mechanical losses.

Early electric motors were designed to use direct current (DC) with a commutator switch. These motors were simple to control and provided the sufficient traction requirements because of their torque-speed characteristics. Traditional DC motors include series excited, shunt excited, compound excited and permanent magnet (PM) excited motors. These designs were ultimately phased out because of their high maintenance cost and heavy weight, low speed and low specific power. Recent developments saw the rise of commutator-less, alternating current (AC) motors, who, though they come with a higher complexity, offer higher efficiency, power density, lighter weight and maintenance needs. The higher complexity is mostly due to the need to convert the DC from the energy storage to AC. The three main types of AC motors currently used in the automotive industry are: Induction Motors (IM); Synchronous Motors; Switched Reluctance Motors (SRM). Because of their different attributes, these AC motors are used in different applications. IMs are prevalent for larger vehicles such as trucks and buses, while synchronous motors are being adopted for passenger cars. SRM are also considered for EVs but at the moment have too many disadvantages for mass adoption, such as acoustic noise and torque ripple. The electric motor 13 of the present disclosure may be an AC motor. However, the principles of the present disclosure may also apply to electric vehicles having any kind of electric motor (e.g., AC, DC).

In the embodiment shown, the electric vehicle 10 includes the differential 15, which may be referred to as a driveline or final drive. The differential 15 may be the last element to connect the electric motor traction to the road, and depends on the vehicle configuration. A typical scenario would see a driveshaft connecting the transmission with a differential. The latter would then join the driven wheels through the drive axle. The differential is a gear box that directs the engine power to the pair of driving wheels, and allows the pair to rotate at different speeds during cornering. Finally, the difference in gear size in the differential may allow a final step down of the overall gear ratios from the engine to the driven wheels. Some configurations may not require a differential. In some configurations, the differential 15 may be omitted.

The transmission 20 is the mechanism in any type of vehicle that manages the output torque and power of the engine or electric motor 13 to the wheels 16. It consists of several gear ratios designed to achieve some pre-established performance, efficiency, drivability and cost specifications. The chosen strategy depends mostly on the speed-torque characteristics of the motor, with the most prevalent designs being: Manual Transmissions (MT); Automatic Transmissions (AT); Automated Manual Transmission (AMT); Dual Clutch Transmissions (DCT); Continuous Variable Transmissions (CVT).

CVTs may offer continuous and step-less gear ratios, as opposed to other alternatives (e.g., manual transmission). This configuration may allow the selection of the gear ratio that would place the electric motor 13 in its optimum operating point, i.e., where it is the most efficient. This operation at the most efficient region thus may enhance range by decreasing power consumption of the electric motor 13. A specific type of CVT is the infinitely variable transmission (IVT) that allows a null gear ratio, effectively decoupling the traction motor from the driveshaft, allowing idling of the motor.

Because of the wide speed range in most electric motors used in the automotive industry, typical EVs do not need the multitude of speed-ratios in their transmissions systems. Numerous commercial EVs today use a speed-reduction gearbox or a two-speed transmission to increase performance and efficiency or downsize the traction motor. However, there may be a gain in efficiency and in range by using a transmission allowing to operate the electric motor 13 at its most efficient regime for any given travel speed of the electric vehicle 10.

Figure 2:
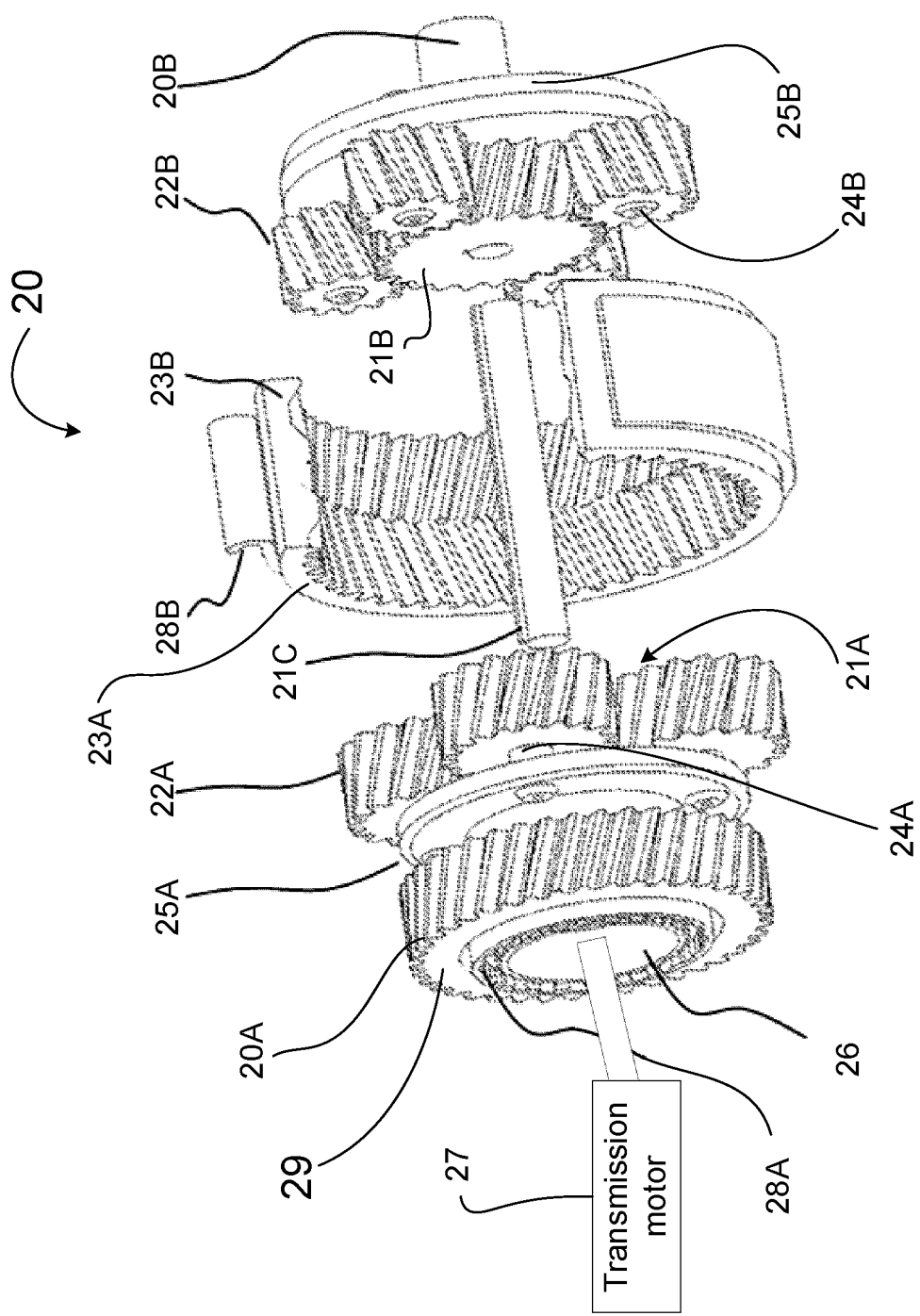
FIG. 2 is a schematic three dimensional exploded view of a continuously-variable transmission for the vehicle of FIG. 1.
Figure 3:
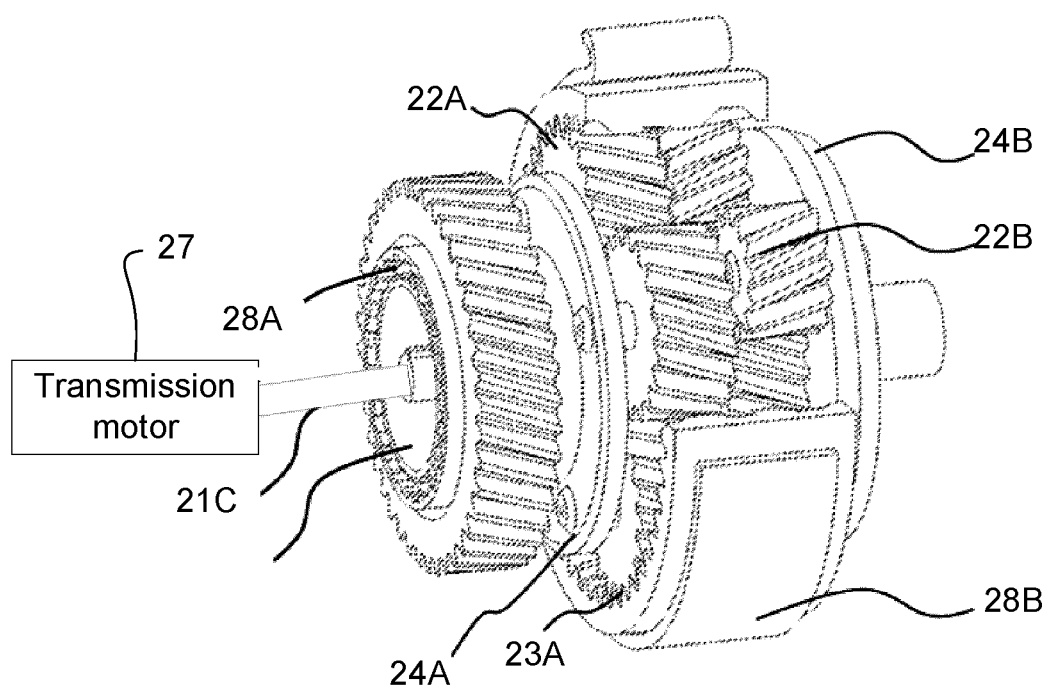
FIG. 3 is a schematic three dimensional view of the continuously-variable transmission of FIG. 2.

Referring now to FIGS. 2-3, the transmission 20 is described in more detail. The transmission 20 includes a gearbox comprising two planetary gear trains that are coupled to one another. The transmission 20 includes two sun gears, namely a first sun gear 21A and a second sun gear 21B drivingly engaged to one another via a sun gear shaft 21C for integral rotation one with the other. In other embodiments, the first and second sun gears 21A, 21B may be parts of a single monolithic body. Thus, the sun gear shaft 21C may be avoided in some configurations. Hence, the first and second sun gears 21A, 21B engaged together form a first rotating spool. The transmission 20 includes a first set of planet gears 22A meshed with the first sun gear 21A and a second set of planet gears 22B meshed with the second sun gear 21B. A first ring gear 23A extends around the first set of planet gears 22A and is meshed with the first set of planet gears 22A. A second ring gear 23B extends around the second set of planet gears 22B and is meshed with the second set of planet gears 22B. The first ring gear 23A is engaged to the second ring gear 23B for integral rotation with one another. The first and second ring gears 23A, 23B engaged together form a second rotating spool. The first and second ring gears 23A, 23B may be parts of a single monolithic body or secured together via connecting members. The first set of planet gears 22A are rollingly supported by first shafts 24A of a first carrier 25A whereas the second set of planet gears 22B are rollingly supported by second shafts 24B of a second carrier 25B. In the embodiment shown, the input 20A of the transmission 20 corresponds to the first carrier 25A and the output 20B of the transmission 20 corresponds to the second carrier 25B. The input 20A, as shown in FIG. 2, includes a gear 29 meshed with another gear drivingly engaged to the electric motor 13. A hub 26 is drivingly engaged to the first and second sun gears 21A, 21B, herein via the sun gear shaft 21C. The hub 26 and the gear 29 of the input 20A are rotatable one relative to the other. In some configurations, the hub 26 may be omitted. Other configurations of the transmission 20 are described below.

In the context of the present disclosure, the expression "engaged together" with reference to the first and second rotating spools implies that two gears are rotating in unison. It may imply that the two gears rotate at the same speed. Those two gears, when engaged together, may be non-rotatable one relative to the other. In some embodiments, a speed ratio different than one may be provided between two gears being engaged together. However, even if a speed ratio is present, when one of the two gears engaged together rotates, the other rotates as well. They may be considered to be "locked" to one another in rotation whether the speed ratio of those two gears is one or different then one.

In the present embodiment, the two sun gears 21A, 21B differ by their diameters whereas the two ring gears 23A, 23B have the same diameter. The two ring gears 23A, 23B may therefore be replaced by a single ring gear. Alternatively, the two ring gears may differ by their diameters whereas the two sun gears 21A, 21B may have the same diameter. In this case, the two sun gears 21A, 21B may be replaced by a single sun gear. Any suitable combinations of the above is contemplated. The diameters of the first and second planet gears 22A, 22B is selected such that they are meshed with both of the first and second sun gears 21A, 21B and the first and second ring gears 23A, 23B.

A first braking mechanism 28A is used to selectively limit or block rotation of the first rotating spool and may be operatively connected to the sun gear shaft 21C and the first and second sun gears 21A, 21B. The first braking mechanism 28A is herein depicted as being operatively connected to the hub 26. Other configurations are however contemplated. A second braking mechanism 28B is used to limit or block rotation of the second rotating spool and may be operatively connected to first and/or second ring gears 23A, 23B. The first braking mechanism 28A may include friction plates or any other suitable device. The second braking mechanism 28B may include a band for frictionally engaging the ring gears. Any suitable braking mechanism (e.g., disc brakes) are contemplated without departing from the scope of the present disclosure.

In the embodiment shown, the gearbox 14 may be placed between the electric motor 13 and the transmission 20 and is used to reduce the angular velocity observed at the input of the transmission 20. The purpose of this speed reduction is to avoid unnecessarily large speeds within the two planetary gear sets, as it is postulated that within specific conditions, the sun gears could spin three times as fast as the input shaft of the transmission 20. A high speed at the sun gear might cause undesirable side effects, such as vibrations, noise, as well as requiring a faster motor connected to the sun gears. A gear ratio provided by the gearbox 14 may be 3. This gear ratio corresponds to a rotational speed of an input of the gearbox to a rotational speed of an output of the gearbox 14. Moreover, the differential or differential 15 may provide a gear ratio of 2.07, which corresponds to a rotational speed of an input of the differential 15 to a rotational speed of an output of the differential 15. In some configurations, the gearbox 14 may be omitted.

The transmission 20 is able to achieve at least two gear ratios. These gear ratios are achieved when either the first braking mechanism 28A or the second braking mechanism 28B is activated to block either the sun gears 21A, 21B or the ring gears 23A, 23B, allowing the different pitch diameter of the ring and sun gear in the first and second planetary to provide two distinct gear ratios. Put differently, a first gear ratio is achieved when the input 20A is drivingly engaged to the output 20B via the sun gears 21A, 21B; a second gear ratio is achieved when the input 20A is drivingly engaged to the output 20B via the ring gears 23A, 23B. In the present embodiment, the input 20A and the output 20B are respectively connected to the first and second carriers 25A, 25B of the first and second stages. The transmission 20 may allow gear shifting without a clutch, and thus may provide a perpetual mechanical connection of the powertrain. More detail about the transmission 20 is provided in U.S. Pat. No. 9,702,438, the entire contents of which are incorporated herein by reference in their entirety.

A first gear ratio is achieved where rotation of the ring gears 23A, 23B is limited and where the power transfer is done through the sun gears 21A, 21B. A second gear ratio is achieved where the rotation of the sun gears 21A, 21B is limited and the power is transferred through the ring gears 23A, 23B. A transition phase may occur during the gear shift, where neither brake is fully engaged and slips and both the ring and sun transmit power to the wheels 16. The braking mechanisms applied on the ring gears 23A, 23B and sun gears 21A, 21B are chosen to be of the dry, mechanical type, namely band and multi-plate respectively, in order to maximize energy efficiency. Any suitable kind of brakes are contemplated without departing from the scope of the present disclosure. In the present embodiment, if neither brake is applied and the transmission motor is not energized, the mechanism freewheels.

The kinematic analysis between the carrier (C), sun (S), planets (P) and ring (R) of such a transmission mechanism is elaborated below. The overall gear ratio (GR), that is, the ratio of input to output speed, is largely dependent on the rotation speed of the ring ($\omega_r$) and sun gear (w), as well as the selected gear radii ratios of the ring and sun gear, $R_1$ and $R_2$, in the first and second planetary gear set respectively. It is given by:

$$GR = \frac{\omega_{C,in}}{\omega_{C,out}} = \frac{(R_2+1)(\omega_s + R_1\omega_r)}{(R_1+1)(\omega_s + R_2\omega_r)}$$

On the one hand, applying the ring brake (or =0), gives a first gear ratio of:

$$GR_1 = \frac{\omega_{C,in}}{\omega_{C,out}} = \frac{(R_2+1)}{(R_1+1)}$$

On the other hand, braking the sun gear (w, =0) gives a second gear ratio of:

$$GR_2 = \frac{\omega_{C,in}}{\omega_{C,out}} = \frac{(R_2+1)R_1}{(R_1+1)R_2}$$

In the embodiment shown, ring and sun radii ratios of R1=2 and R2=4, in the first and second planetary set respectively, leading to a first and second gear ratio of GR1=1.667 and GR2=0.833. Those values are exemplary only and other ring and sun radii ratios may be used. However, in some instances, it may be desirable to have more than two gear ratios. This may enable the operating of the electric motor 13 is a more efficient regime and may extend the range of the electric vehicle 10.

The transmission 20 of the present disclosure aims to make the most of the seamless, clutch-less nature of the double planetary gear trains described above, as well as its high efficiency, while exploring the benefit of adding a range of achievable gear ratios, thus turning the mechanism into a continuously variable transmission. CVTs may allow the electric motor to operate in its highest efficiency regions more frequently, thus achieving lower energy consumption and overall GHG emissions.

In the embodiment shown, the transmission includes a transmission motor 27 drivingly engaged to the first rotating spool, herein, to the first and second sun gears 21A, 21B via the hub 26, in any appropriate way (e.g., via a shaft, a gear, a gear box, chain-sprocket assembly). Alternatively, the transmission motor 27 may be engaged to the second rotating spool, which herein includes the first and second ring gears 23A, 23B. The transmission motor 27 may be used to provide a rotational input to the first rotating spool, herein via the sun gear shaft 21C, and to the first and second sun gears 21A, 21B engaged thereto. The transmission motor 27 may be a smaller, torque-controlled electric motor connected to the first and second sun gears 21A, 21B of the transmission 20, while disengaging the two braking mechanisms 28A, 28B. Any suitable motor may be used for the transmission motor 27. This may enable the operation of the transmission 20 in the transient gear ratio. By controlling the angular velocity of the first and second sun gears 21A, 21B, given the current velocity of the input 20A and ring gears 23A, 23B, a wide range of gear ratios may be achievable. The transmission motor 27 is preferably smaller than the electric motor 13 of the vehicle 10 such that a power consumption of the transmission motor 27 is substantially negligible compared to that of the electric motor 13, which provides propelling power to the wheels 16 of the electric vehicle 10. It may nevertheless be of similar size as the electric motor 13.

It was observed that very low torque are required at the ring and sun brakes 28A, 28B during the gear shifting process of the transmission 20. It was also observed that during gear shifting operations, the engagement and disengagement of the ring or sun gears, depending on the direction of the shift, may facilitate the shift action by accelerating the on-coming gear and decelerating the off going gear. For example, during upshift, engaging the sun brake exerts a positive torque on the ring and negative torque on the sun gear, while gradually disengaging the ring brake has the inverse effect.

In addition to this transient mode, the transmission 20 may maintain the use of the braking mechanisms at the sun and ring gears, permitting the same underdrive and overdrive speed ratios. Certain modes of operations, such as rapid acceleration or high cruising speed, may require the use of these extremum cases. The key difference is the population of the large step between the first and second gears with an infinite number of gears ratios.

Operating the transmission 20 with neither sun nor ring brake activated, effectively using the transient gear ratio, is described by the equation:

$$GR_T = \frac{\omega_{C,in}}{\omega_{C,out}} = \frac{(R_2 + 1)(\omega_s + R_1\omega_r)}{(R_1 + 1)(\omega_s + R_2\omega_r)}$$

which can be rewritten to find the value of $\omega_s$ that will achieve a desired gear ratio $GR_D$:

$$\omega_s = \omega_r \times \frac{R_1(R_2 + 1) - GR_D R_2(R_1 + 1)}{GR_D(R_1 + 1) - (R_2 + 1)}$$

This means that, at any point in time during operations, the transmission may be controlled to achieve a speed ratio that would place the electric motor 13 at a more efficient operating point while providing the same power at the output of the transmission 20, by setting the corresponding velocity of the sun gear shaft 21C.

For acceleration purposes, when underdrive is needed to maximize torque, the transmission 20 may brake the ring gears 23A, 23B to achieve an underdrive gear ratio of GR1=1.667, as explained above. Once the electric motor 13 is operating in a more strategic region, it may be possible to start controlling the rotation of the sun gears 21A, 21B ($\omega_s$) to decrease the gear ratio after releasing the ring brake, and optimizing the electric motor 13 along the power lines in its torque speed curve. A decreasing speed trajectory is imposed on the sun gears 23A, 23B, to bring the speed $\omega_s$ to zero, where the sun brake 28A is now activated. This latter condition corresponds to the second gear ratio, namely GR2=0.833, or overdrive operation.

As shown in FIG. 1, the transmission motor 27 is operatively connected to a transmission controller 30, which may be part of the controller 12 of the electric vehicle 10 in one embodiment. Both may have or share a processing unit, and may include a non-transitory computer-readable memory communicatively coupled to the processing unit and comprising computer-readable program instructions executable by the processing unit. The transmission motor 27 is operatively connected to the energy storage 18 (e.g., battery) or to another power source. The transmission controller 30 receives data about a torque generated by the electric motor 13 and about a rotational speed of a motor output of the electric motor 13 and computes the corresponding input mechanical power by multiplying them. The transmission controller 30 then determines the appropriate gear ratio required by the transmission 20 such that the electric motor 13 is operated at its most efficient point. The transmission controller 30 then determines a rotational speed of the transmission motor 27 and corresponding rotational speed and torque of the electric motor 13 providing the same mechanical power based on the determined gear ratio. The transmission controller 30 then induces rotation of the transmission motor 27 at the determined rotational speed while sending updated values of the determined rotational speed and torque of the electric motor 13 to the controller 12. Any suitable sensors may be operatively connected to the electric motor 13 to determine the rotational speed of the motor output and the torque generated by the electric motor 13. In the embodiment shown, a torque sensor 31 and a speed sensor 32 are operatively connected to the electric motor 13 and to the transmission controller 30. The transmission motor 27 may be a speed controlled electric motor. If the transmission motor 27 has defined torque speed characteristics and efficiency map, the transmission controller 30 could select gear ratios that optimize the combined efficiency of the electric motor 13 and the transmission motor 27. In some embodiments, the transmission motor 27 may be sufficiently small to assume a constant efficiency.

Vehicle acceleration, deceleration and cruising at a constant speed all require overcoming resistances: aerodynamic resistance, tire rolling resistance, powertrain friction, gravity and inertia. The transmission controller 30 may receive sensor signal(s) from suitable sensor(s) indicative of forces (e.g., drag, weight, etc) applied on the electric vehicle 10 while rolling. Given a drive cycle test, and the acceleration and deceleration commands provided by the accelerator 17, the controller 12 is designed to output the corresponding torque demand on the electric motor 13 of the vehicle 10 to appropriately track the reference velocity.

The transmission controller 30 may be a real-time controller that, given the current speed of the vehicle 10 and operating point of the electric motor 13, may utilize the sun and ring brakes 28A, 28B, as well as vary the speed of the transmission motor 27, to modify the gear ratio of the transmission 20 in order to operate the electric motor 13 in its optimal region.

Parameters of the electric vehicle 10 are listed in the table below. It is however understood that these parameters are exemplary only and that the principles of the present disclosure may be used with any electric vehicle.

| Category | Parameter | Value | Unit |
| --- | --- | --- | --- |
| Vehicle | Curb Weight | 1580 | kg |
|  | Frontal Area | 2.8 | $m^2$ |
|  | Drag Coefficient | 0.28 | unitless |
| Environment | Air Density | 1.2041 | $kg \cdot m^{-3}$ |
| Electric Motor | Maximum torque | 280 | $N \cdot m$ |
|  | Maximum Speed | 10000 | rpm |
|  | Rated Power | 80 | kW |
|  | Base Speed | 3000 | rpm |
| Transmission | Input Carrier Moment of Inertia | $1.8 \times 10^{-3}$ | $kg \cdot m^2$ |
|  | Common Ring Moment of Inertia | $3 \times 10^{-3}$ | $kg \cdot m^2$ |
|  | Common Sun Moment of Inertia | $8 \times 10^{-4}$ | $kg \cdot m^2$ |
|  | Output Carrier Moment of Inertia | $6 \times 10^{-3}$ | $kg \cdot m^2$ |
|  | Planetary Set 1 Ring/Sun Radii Ratio | 2 | unitless |
|  | Planetary Set 2 Ring/Sun Radii Ratio | 4 | unitless |
| Differential | Differential Ratio | 7.94:1 | unitless |
| Wheel | Wheel Radius | 0.31623 | m |
|  | Tire Rolling Resistance Coefficient | 0.015 | unitless |
| Battery | Capacity | 24 | kWh |

A torque-speed efficiency map of the electric motor 13 is shown in FIG. 4. This map may be obtained by measuring at a DC-link voltage of 375V, a frequency of 5 kHz, and a water-ethylene glycol temperature of 65 degrees Celsius. As shown, the electric motor 13 has a wide operation range at above 90% efficiency, with up to 96% achieved between 6500 and 9000 rpm. However, the efficiency drops at low speeds to under 70%. The transmission controller 30 may have stored thereon this efficiency map. For instance, the map may be saved on a memory of the transmission controller 30 and/or on a memory of the controller 12. The transmission controller 30 may be able to interpolate where data points of speed and torque are not present in the efficiency map. Any suitable interpolation algorithm may be used. The efficiency map may be stored in the memory of the transmission controller 30 as a lookup table.

In use, as the reference speed starts increasing, the transmission controller 30 activates the ring brake 28B, and lets the sun gears 21A, 21B freely spin. This recreates the underdrive ratio of GR1=1.6667, which may be required during phases where high torque is needed for acceleration. Other values of this under drive gear ratio may be used. As the vehicle exceeds a predetermined threshold speed, the transmission controller 30 releases the ring gear 23A, 23B. The transmission 20 now has a gear ratio $GR_T$ detailed above. The transmission controller 30 varies the speed of the transmission motor 27 to achieve a desired gear ratio, given the angular velocity of the ring gears 23A, 23B. The selection of rotational speed of the transmission motor 27 is made as discussed below. It may be however constrained to a maximum value to prevent the transmission motor from spinning negatively. At high speeds, when overdrive is desired, the transmission motor 27 decelerates the sun gears 21A, 21B. Once the sun gears 21A, 21B reach an appropriately low speed, the transmission controller 30 activates the sun brake 28A, achieving the overdrive gear ratio GR2=0.883. Other values of this overdrive gear ratio may be used.

To find the optimal gear ratio, a line search may be performed in real-time by the transmission controller 30. This search is performed along isopower lines of torque-speed graph (FIG. 4). Namely, at each iteration, multiple points corresponding to equivalent input motor power but different speeds are selected, and the corresponding input motor efficiency (IME) is inferred from the two-dimensional look up table discussed above. The highest efficiency is selected and determines the direction the transmission should move towards. Increasing the rotational speed of the transmission motor 27, and of the sun gears 21A, 21B, increases the observed gear ratio of the transmission 20, while decreasing the rotational speed of the transmission motor 27 subsequently decreases the observed gear ratio of the transmission 20. In turn, increasing the gear ratio displaces the operating point of the electric motor 13 in the right direction (on FIG. 4) of increasing speed and lowering torque. There is thus an indirect relationship between the rotation speed of the transmission motor 27 and the electric motor 13.

The line search may use a pre-calculated normalized gradient mapping of the efficiency map of FIG. 4, which may be made using a two-dimensional look-up table. This gradient, noted VIME, varies from −1 to 1, and is a representation of the direction the gear ratio of the CVT should move the operating point of the electric motor 13. Using this value, the line search can anticipate the direction of search, as well as reduce the step size of the search for lower absolute values of VIME, which demonstrate a proximity to the optimal operating point.

Another variable that may be kept constant is the gear switch breakpoint of the transmission 20, which may have an influence over performance and efficiency results. It was found that, in the present embodiment, controlling the transmission 20 such that it switches gear when the vehicle speed exceeds 65 km/h may be desirable. This speed is selected to maximize operations in the high efficiency regions of the electric motor 13. A tolerance band is used, while discriminating acceleration and deceleration of the vehicle. This may thus prevent the phenomenon known as gear hunting. This phenomenon happens when the vehicle frequently accelerates and decelerates around the gear shift value, resulting in the transmission controller 30 going back and forth between gear ratios.

Moreover, it will be appreciated that, while braking and slowing down the vehicle, the transmission controller 30 may control the rotational speed of the transmission motor 27 to maximize a recharging of the energy storage 18. That is, an optimal gear ratio for recharging may be found using the method described above. The transmission motor 27 when now powered may be used to recharge a battery accumulator.

It was observed that, with the disclosed transmission 20 equipped with the transmission motor 27, as the speed of the vehicle increases, the transmission 20 is able to bring the electric motor 13 to higher efficiency regions. This may be particularly marked when the speed of the vehicle is above 50 km/h, where the electric motor 13 operates at its highest efficiency points.

It was further observed that, when simulating for drive cycle with high average velocity, supplying the vehicle with the disclosed transmission 20 improved the time spent in high efficiency regions of the electric motor 13 compared to when the vehicle is equipped without a transmission or with a transmission free of the transmission motor 27. In terms of average input motor efficiency, gains of 2.2 and 4.6% are observed using the disclosed transmission 20 compared to using no transmission. Comparing the disclosed transmission 20 to another two-speed transmission without a transmission motor 27, gains of 3.7 and 1.5% are observed. For drive cycles averaging lower speeds, more typical of urban driving, efficiency improvements were also observed using the disclosed transmission.

In some cases, the electric motor 13 has an increased power consumption compared to a configuration using a different or no transmission. This is explained by the fact that, at certain operating conditions, the transmission motor 27 acts as a generator and the electric motor 13 has to compensate for this added load. The disclosed transmission 20, in some operating conditions, may provide an increase in the range of the electric vehicle 10 by about 4%.

In some embodiments, a clutch operatively connected between the transmission motor 27 and the sun gear shaft 21C for the purpose of disengaging the transmission motor 27 in operating conditions where the transmission motor 27 is detrimental to the efficiency.

It will be appreciated that the transmission motor 27 may be used to select the most optimal gear ratio when the electric motor 13 is operated as a generator. In other words, when the electric vehicle 10 is braking, the electric motor 13 may be used as a generator to recharge the battery of the electric vehicle 10 by receiving a rotational input from wheels of the electric vehicle 10. The transmission motor 27 may therefore allow the selection of a gear ratio that optimizes the recharging of the battery.

Figure 5:
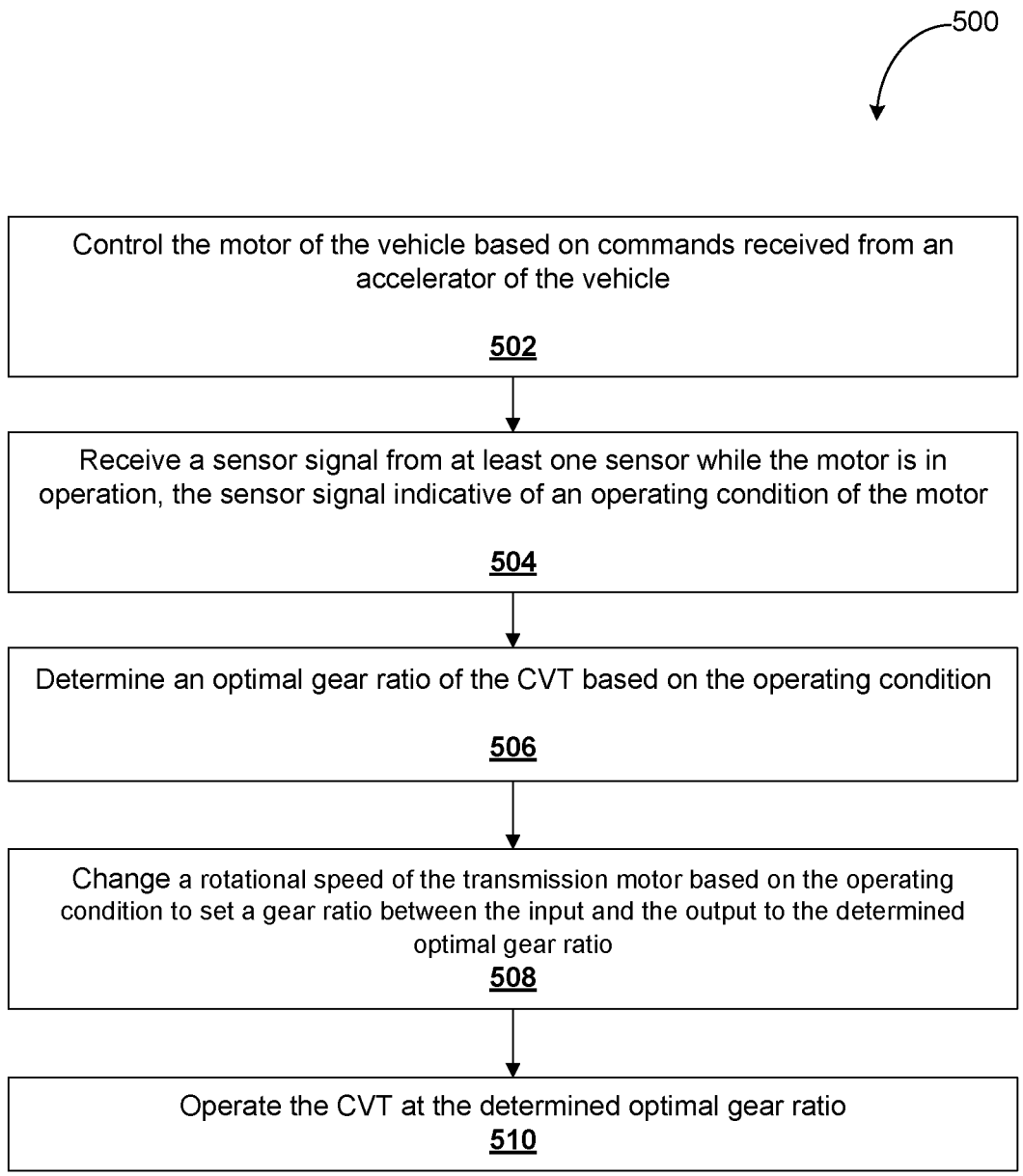
FIG. 5 is a flow chart illustrating steps of a method for controlling the continuously-variable transmission of FIG. 2.

Referring now to FIG. 5, a method of operating the transmission 20 is shown at 500. The method 500 includes controlling the electric motor 13 of the electric vehicle 10 based on commands received from the accelerator 17 of the electric vehicle 10 at 502; receiving a sensor signal from at least one sensor while the electric motor 13 is in operation, the sensor signal indicative of an operating condition of the electric motor 13 at 504; determining an optimal gear ratio of the transmission 20 based on the operating condition at 506; changing a rotational speed of the transmission motor 27 based on the operating condition to set a gear ratio between the input and the output to the determined optimal gear ratio at 508; and operating the transmission 20 at the determined optimal gear ratio at 510.

In the embodiment shown, the at least one sensor includes the torque sensor 31 and the speed sensor 32 operatively connected to the controller 12 and to the electric motor 13. The receiving of the sensor signal at 504 includes receiving a torque signal indicative of a torque generated by the electric motor 13 and receiving a speed signal indicative of a rotational speed of the electric motor 13. In the present embodiment, the operating condition is one or more of the rotational speed and the torque of the electric motor 13.

The determining of the optimal gear ratio at 506 may include determining an optimal rotational speed of the electric motor 13 based on the torque and determining the optimal gear ratio as a function of an actual rotational speed of the electric motor 13 and the optimal rotational speed. The determining of the optimal rotational speed of the electric motor 13 may include determining the optimal rotational speed based on a torque-speed efficiency map (FIG. 4) of the electric motor 13. Alternatively, a function correlating the efficiency to the torque and the speed may be hard-coded in the controller 12.

In the present embodiment, when a user presses on the accelerator 17 to maintain the electric vehicle 10 at a given cruise speed, the transmission controller 30 (or the controller 12) determines a torque to be supplied to the wheels 16 of the electric vehicle 10 to maintain this given cruise speed. As shown in FIG. 4, many rotational speeds of the output of the electric motor 13 may yield the same torque. For instance, a torque of 100 Nm may be achieved at a rotational speed of 2000 RPM and at a rotational speed of 7000 RPM. However, the efficiency of the electric motor 13 is not the same at those two rotational speeds. Namely, the efficiency is of about 90% at 2000 RPM while it is about 96% at 7000 RPM. It may therefore be beneficial to run the electric motor at 7000 RPM to extend a range of the electric vehicle 10. However, although the electric motor 13 rotates at a higher speed, the cruise speed of the electric vehicle 10 may remain constant. The transmission 20 therefore selects an appropriate gear ratio allowing the electric motor 13 to rotate at 7000 RPM while maintaining the rotational speed of the wheels 16 substantially constant.

The optimal gear ratio may be determined based on the optimal rotational speed of the electric motor 13 and based on the rotational speed of the wheels 16 known as a function of the desired cruise speed. With this optimal gear ratio, the transmission controller 30 may determine the rotational speed of the transmission motor 27 using the following equation, which is described above:

$$\omega_s = \omega_r \times \frac{R_1(R_2+1) - GR_D R_2(R_1+1)}{GR_D(R_1+1) - (R_2+1)}$$

This equation for $\omega_s$ does not hold in the two limit cases of or $\omega_r=0$ or $\omega_s=0$ for an arbitrary choice of GR. In either of these two cases, the gear ratio GR is fixed and given respectively by $$GR_1 = \frac{\omega_{C,in}}{\omega_{C,out}} = \frac{(R_2+1)}{(R_1+1)} \text{ and } GR_2 = \frac{\omega_{C,in}}{\omega_{C,out}} = \frac{(R_2+1)R_1}{(R_1+1)R_2}$$

For the case $\omega_s=0$, GR must be chosen equal to GR=R1 (R2+1)/[R2(R1+1)] in which case the term multiplying $\omega_r$ on the right-hand side of the equation for $\omega_s$ evaluates to 0, leading to $0=\omega_r*0$ and meaning that $\omega_r$ is not set by $\omega_s$.

In the embodiment shown, the determining of the optimal gear ratio at 506 includes determining an optimal rotational speed of the electric motor 13 based on the torque and determining the optimal gear ratio as a function of an actual rotational speed of the electric motor 13 and the optimal rotational speed. In the embodiment shown, the determining of the rotational speed of the transmission motor at 508 includes determining the optimal rotational speed based on a torque-speed efficiency map of the electric motor 13. An exemplary torque-speed efficiency map is shown in FIG. 4.

With the optimal gear ratio, the rotational speed of the transmission motor 27 may be determined. The transmission motor 27 may thus be operated at this rotational speed so that the transmission 20 provides the optimal gear ratio. The transmission 20 may thus be used at the optimal gear ratio with the transmission motor 27 operated at the determined rotational speed.

The transmission 20 has been described above has having the two sun gears 21A, 21B being part of the first rotating spool, the two ring gears 23A, 23B parts of the second rotating spool, the input 20A corresponding to the first carrier 25A, and the output 20B corresponding to the second carrier 25B. However, it will be appreciated that many alternative configurations may be used without departing from the scope of the present disclosure. For instance, the first rotating spool may be defined by any of the two sun gears 21A, 21B connected together, the two ring gears 23A, 23B connected together, or the two carriers 25A, 25B connected together. Similarly, the second rotating spool may be defined by any of another one of the two sun gears 21A, 21B connected together, the two ring gears 23A, 23B connected together, or the two carriers 25A, 25B connected together. The input and the output of the transmission 20 are then defined by the components (e.g., two carriers) that are not connected to one another. They may be defined respectively by the two sun gears, the two ring gears, or the two carriers.

Thus, in an alternate embodiment, the first and second carriers 25A, 25B may be engaged together thereby creating the first spool, the first and second ring gears 23A, 23B may be engaged together thereby creating the second spool, and the input 20A may correspond to the first sun gear 21A while the output 20B may correspond to the second sun gear 21B. The transmission motor 27 may be drivingly engaged to the first spool or the second spool.

In another alternate embodiment, the first and second carriers 25A, 25B may be engaged together thereby creating the first spool, the first and second sun gears 21A, 21B may be engaged together thereby creating the second spool, and the input 20A may correspond to the first ring gear 23A while the output 20B may correspond to the second ring gear 23B. The transmission motor 27 may be drivingly engaged to the first spool or the second spool.

The transmission motor 27 may be drivingly engaged to the ring, carrier, sun gears, in any appropriate way (e.g., via a gear, a gear box, chain-sprocket assembly). That is, the transmission may use the sun gears as input and output of the transmission instead of the carriers; the brakes being operatively connected to the carriers and to the ring gears. The transmission may use the rotational velocity of the connected ring gears to control the speed ratio of the transmission; the brakes being operatively connected to the carriers and to the ring gears. In such a case, the transmission motor may be drivingly engaged to either of the carriers and the ring gears. In another embodiment, the transmission may use the ring gears as input and output of the transmission instead of the carriers; the brakes being operatively connected to the carriers and to the sun gears. In such a case, the transmission motor may be drivingly engaged to either of the carriers and the sun gears.

More detail about the transmission 20 may be found in Medouar, A. (2019). Dual planetary based continuously variable transmission for electric vehicles, the entire contents of which are incorporated by reference herein.

Figure 6:
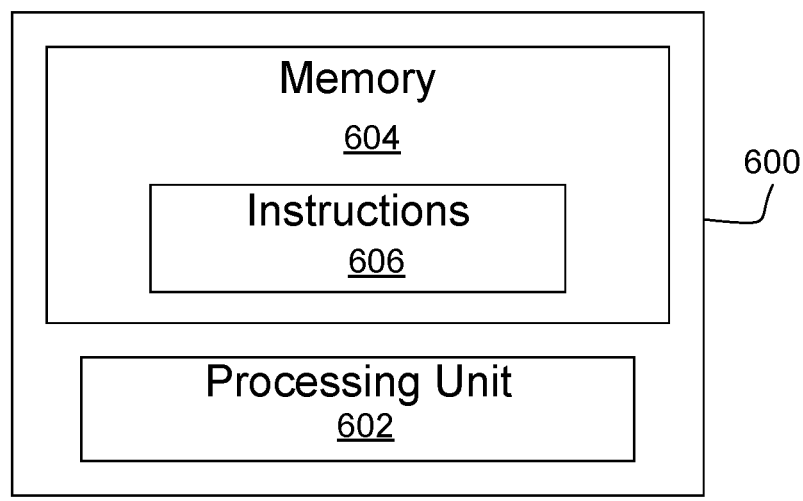
FIG. 6 is a schematic view of a controller in accordance with one embodiment that may be used for the vehicle of FIG. 1.

Referring now to FIG. 6, an example embodiment for the controller 12 or of the transmission controller 30 of the electric vehicle 10 is shown in detail. As illustrated, the controller is embodied as a computing device 600. Although only one computing device 600 is shown for simplicity, multiple computing devices 600 operable to exchange data may be employed, as appropriate. The computing devices 600 may be the same or different types of devices. The computing device 600 comprises a processing unit 602 and a memory 604 having stored therein computer-executable instructions 606. The processing unit 602 may comprise any suitable devices configured to implement the functionality described herein, including the various methods described herein, such that instructions 606, when executed by the computing device 600 or other programmable apparatus, may cause the functions/acts/steps described herein to be executed. The processing unit 602 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 604 may comprise any suitable known or other machine-readable storage medium. The memory 604 may comprise non-transitory computer readable storage medium, for example, but not limited to, an electronic, magnetic, optical, electromagnetic, infrared, or semiconductor system, apparatus, or device, or any suitable combination of the foregoing. The memory 604 may include a suitable combination of any type of computer memory that is located either internally or externally to the computing device 600, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 604 may comprise any storage means (e.g., devices) suitable for retrievably storing machine-readable instructions 606 executable by processing unit 602.

The methods and systems of the present disclosure may be implemented in a high level procedural or object oriented programming or scripting language, or a combination thereof, to communicate with or assist in the operation of a computer system, for example the controller 132. Alternatively, the methods and systems described herein may be implemented in assembly or machine language. The language may be a compiled or interpreted language. Program code for implementing the methods and systems described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems described herein may also be considered to be implemented by way of a non-transitory computer-readable storage medium having a computer program stored thereon. The computer program may comprise computer-readable instructions which cause a computer, or more specifically the processing unit 602 of the computing device 600, to operate in a specific and pre-defined manner to perform the functions described herein, for example those described in the method 500 of FIG. 5.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments. The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

As can be seen therefore, the examples described above and illustrated are intended to be exemplary only. The scope is indicated by the appended claims.

What is claimed is:

1. A continuously-variable transmission (CVT) for an electric vehicle having an electric motor, comprising:
    a gearbox having
        a first planetary gear train having a first sun gear, first planet gears meshed with the first sun gear and rollingly supported by a first carrier, and a first ring gear meshed with the first planet gears,
        a second planetary gear train having a second sun gear, second planet gears meshed with the second sun gear and rollingly supported by a second carrier, and a second ring gear meshed with the second planet gears,
        a first rotating spool defined by one of the first sun gear and the second sun gear engaged together, the first carrier and the second carrier engaged together, and the first ring gear and the second ring gear engaged together,
        a second rotating spool defined by another one of the first sun gear and the second sun gear engaged together, the first carrier and the second carrier engaged together, and the first ring gear and the second ring gear engaged together,
        an input defined by a remaining one of the first sun gear, the first carrier, and the first ring gear, and
        an output defined by a remaining one of the second sun gear, the second carrier, and the second ring gear;
    a first brake operatively connected to the first rotating spool for selectively blocking rotation of the first rotating spool;
    a second brake operatively connected to the second rotating spool for selectively blocking rotation of the second rotating spool; and
    a transmission motor drivingly engaged to the first rotating spool or to the second rotating spool.

2. The CVT of claim 1, wherein the first rotating spool is defined by the first sun gear engaged to the second sun gear, the second rotating spool defined by the first ring gear engaged to the second ring gear, the input defined by the first carrier, the output defined by the second carrier.

3. The CVT of claim 2, wherein the first sun gear and the second sun gear are parts of a single sun gear.

4. The CVT of claim 3, wherein the first ring gear and the second ring gear are parts of a single ring gear.

5. The CVT of claim 1, wherein one or more of the first sun gear, the first planet gears, and the first ring gear has a different diameter than a corresponding one of the second sun gear, the second planet gears, and the second ring gear.

6. The CVT of claim 1, including a controller operatively connected to the transmission motor and to the electric motor of the electric vehicle, the controller having a processing unit and a memory operatively connected to the processing unit and having instructions store thereon executable by the processing unit for:
    controlling the electric motor of the electric vehicle based on commands received from an accelerator of the electric vehicle;
    receiving a sensor signal from at least one sensor while the electric motor is in operation, the sensor signal indicative of an operating condition of the electric motor;
    determining an optimal gear ratio of the CVT based on the operating condition;
    changing a rotational speed of the transmission motor based on the operating condition to set a gear ratio between the input and the output to the determined optimal gear ratio; and
    operating the CVT at the determined optimal gear ratio.

7. The CVT of claim 6, wherein the at least one sensor includes a torque sensor and a speed sensor operatively connected to the controller, the receiving of the sensor signal includes receiving a torque signal indicative of a torque generated by the electric motor and receiving a speed signal indicative of a rotational speed of the electric motor, the operating condition being one or more of the rotational speed and the torque.

8. The CVT of claim 7, wherein the determining of the optimal gear ratio includes determining an optimal rotational speed of the electric motor based on the torque and determining the optimal gear ratio as a function of an actual rotational speed of the electric motor and the optimal rotational speed.

9. The CVT of claim 8, wherein the determining of the optimal rotational speed includes determining the optimal rotational speed based on a torque-speed efficiency map of the electric motor.

10. The CVT of claim 1, wherein the electric motor is a generator.

11. An electric vehicle, comprising:
    an electric motor; and
    a continuously-variable transmission (CVT) for transmitting power from the electric motor to wheels of the electric vehicle, the CVT having:
        a gearbox having:
            a first planetary gear train having a first sun gear, first planet gears meshed with the first sun gear and rollingly supported by a first carrier, and a first ring gear meshed with the first planet gears,
a second planetary gear train having a second sun gear, second planet gears meshed with the second sun gear and rollingly supported by a second carrier, and a second ring gear meshed with the second planet gears,
a first rotating spool defined by one of the first sun gear and the second sun gear engaged together, the first carrier and the second carrier engaged together, and the first ring gear and the second ring gear engaged together,
a second rotating spool defined by another one of the first sun gear and the second sun gear engaged together, the first carrier and the second carrier engaged together, and the first ring gear and the second ring gear engaged together,
an input defined by a remaining one of the first sun gear, the first carrier, and the first ring gear, and
an output defined by a remaining one of the second sun gear, the second carrier, and the second ring gear;
a first brake operatively connected to the first rotating spool for selectively blocking rotation of the first rotating spool;
a second brake operatively connected to the second rotating spool for selectively blocking rotation of the second rotating spool; and
a transmission motor drivingly engaged to the first rotating spool or to the second rotating spool.

12. The electric vehicle of claim 11, wherein the first rotating spool is defined by the first sun gear engaged to the second sun gear, the second rotating spool defined by the first ring gear engaged to the second ring gear, the input defined by the first carrier, the output defined by the second carrier.

13. The electric vehicle of claim 12, wherein the first sun gear and the second sun gear are parts of a single sun gear.

14. The electric vehicle of claim 13, wherein the first ring gear and the second ring gear are parts of a single ring gear.

15. The electric vehicle of claim 11, wherein one or more of the first sun gear, the first planet gears, and the first ring gear has a different diameter than a corresponding one of the second sun gear, the second planet gears, and the second ring gear.

16. The electric vehicle of claim 11, including a controller operatively connected to the transmission motor and to the electric motor of the electric vehicle, the controller having a processing unit and a memory operatively connected to the processing unit and having instructions store thereon executable by the processing unit for:
controlling the electric motor of the electric vehicle based on commands received from an accelerator of the electric vehicle;
receiving a sensor signal from at least one sensor while the electric motor is in operation, the sensor signal indicative of an operating condition of the electric motor;
determining an optimal gear ratio of the CVT based on the operating condition;
changing a rotational speed of the transmission motor based on the operating condition to set a gear ratio between the input and the output to the determined optimal gear ratio; and
operating the CVT at the determined optimal gear ratio.

17. The electric vehicle of claim 16, wherein the at least one sensor includes a torque sensor and a speed sensor operatively connected to the controller, the receiving of the sensor signal includes receiving a torque signal indicative of a torque generated by the electric motor and receiving a speed signal indicative of a rotational speed of the electric motor.

18. The electric vehicle of claim 17, wherein the determining of the optimal gear ratio includes determining an optimal rotational speed of the electric motor based on the torque and determining the optimal gear ratio as a function of an actual rotational speed of the electric motor and the optimal rotational speed.

19. The electric vehicle of claim 18, wherein the determining of the optimal rotational speed includes determining the optimal rotational speed based on a torque-speed efficiency map of the electric motor.

20. The electric vehicle of claim 11, wherein the electric motor is a generator.

* * * * *